United States Patent [19]

Knoop

[11] Patent Number: 4,540,858
[45] Date of Patent: Sep. 10, 1985

[54] MODULAR SWITCH UNIT WITH SNAP-IN BASE, SEPARATE MODULAR SWITCH UNIT AND COVER CODED SWITCH ACTUATING INTERIOR LUGS

[75] Inventor: Franz-Josef Knoop, Bueren-Steinhausen, Fed. Rep. of Germany

[73] Assignee: Nixdorf Computer AG, Fed. Rep. of Germany

[21] Appl. No.: 523,084

[22] Filed: Aug. 15, 1983

[30] Foreign Application Priority Data

Aug. 16, 1982 [DE] Fed. Rep. of Germany ....... 3230412

[51] Int. Cl.³ ............................................ H01H 23/04
[52] U.S. Cl. .................................. 200/5 R; 200/6 B; 200/315; 200/333
[58] Field of Search ........... 200/5 R, 5 C, 6 B, 6 BA, 200/6 R, 308, 310, 315, 317, 327, 339, 333

[56] References Cited

U.S. PATENT DOCUMENTS

| | | | |
|---|---|---|---|
| 3,965,319 | 6/1976 | Lockard | 200/6 B X |
| 4,119,823 | 10/1978 | Matsueda et al. | 200/6 R X |
| 4,191,873 | 3/1980 | Woodward | 200/315 X |
| 4,324,956 | 4/1982 | Sakakino et al. | 200/6 B X |
| 4,417,114 | 11/1983 | Larson | 200/310 X |

FOREIGN PATENT DOCUMENTS 1001740 2/1955 Fed. Rep. of Germany ...... 200/333

Primary Examiner—G. P. Tolin
Attorney, Agent, or Firm—Krass & Young

[57] ABSTRACT

A switch arrangement on an electrical apparatus includes a base with two parallel rows of receptacles, a switch module held plugged in, in the base, in which the pairs of contacts together with a switch rocker form a rocker switch, and a cover fastened releasably on the base in one single possible fastening position, which on the inside of its end wall carries operating lugs for the rocker switches.

11 Claims, 4 Drawing Figures

MODULAR SWITCH UNIT WITH SNAP-IN BASE, SEPARATE MODULAR SWITCH UNIT AND COVER CODED SWITCH ACTUATING INTERIOR LUGS

INTRODUCTION AND BACKGROUND

The invention relates to a switch arrangement which is manually settable to encode a multi-bit digital address. Such a switch arrangement may, for example, be used to input an address into a magnetic disk drive or other data processing peripheral unit, under which address the unit is called up by a central unit. The address cannot practically be set in the manufacturing of the equipment in the factory, but rather is set by a user, since the particular address chosen depends on the configuration of the equipment already existing. If, for example, a newly installed unit is the n-th unit for the user, then he may chose to give this unit the decimal number n as its number or address and a binary number equalling this address will be input into the unit by suitably setting the switch arrangement with a number of pairs of contacts equal to the number of digits in the binary number.

A switch arrangement for the above-mentioned purpose is known in which a number of pairs of contacts are arranged in a base, which pairs are distributed along an axis parallel to the axis of the base. By means of a cover fastened onto the base in one single possible fastening position, which cover in its interior includes mechanically coded keys, a certain combination of pairs of contacts is activated. By exchanging the cover for a cover with differently coded keys the number or address set in this way can be altered. However, a disadvantage is that this known switch arrangement has a large construction height because of the axial arrangement of the pairs of contacts. Furthermore, although the pairs of contacts are operated only relatively seldom in the application purpose explained, one must allow for their operating failure. In this case a disadvantage is that a design of the whole base is required, the backward contacts of which are, if necessary, soldered onto a circuit board, which leads to a high repair expense.

There are other rectangular switch modules known which correspond to the usual integrated circuits in the size and arrangement of their connector pins. Such a switch shows on its rear side, along the two lengthwise sides, two rows of connector pins spaced apart at regular intervals and protruding toward the back. The module contains the pair of contacts which are connected in it between two connector pins opposite one another on the lengthwise sides and extend between these. On the front side of the module are exposed switch rockers which are movable between two possible switching positions and around a longitudinal axis parallel to the said lengthwise sides and which together with one pair of contacts respectively form one rocker switch. Such switch modules may be soldered into a circuit board similarly to an integrated circuit. In case of operational failure, however, any soldering is possible only by an expert with a special suitable apparatus. Also, errors can easily intervene in the setting of very small rocker switches.

SUMMARY OF THE INVENTION

The invention is based on the problem of further developing a switch arrangement of the type mentioned at the start in such a way that it exhibits only a small construction size and that any replacement of pairs of contacts which might become necessary is easily possible.

In the switch arrangement according to the invention the pairs of contacts inside the switch module lie transversely to the axis of the base, which yields a low construction height. Since the switch module is held plugged into the module in easily replaceable form, it can if necessary be exchanged for another switch module. Besides this, this interchangeability offers the capability if desired of plugging another electronic element into the base instead of the switch module or in addition to this.

BRIEF DESCRIPTION OF THE DRAWING

The invention is explained in detail in the following on the basis of a drawing in which embodiment examples are represented. In these.

DETAILED DESCRIPTION OF ILLUSTRATIVE EMBODIMENTS

Figure 1:
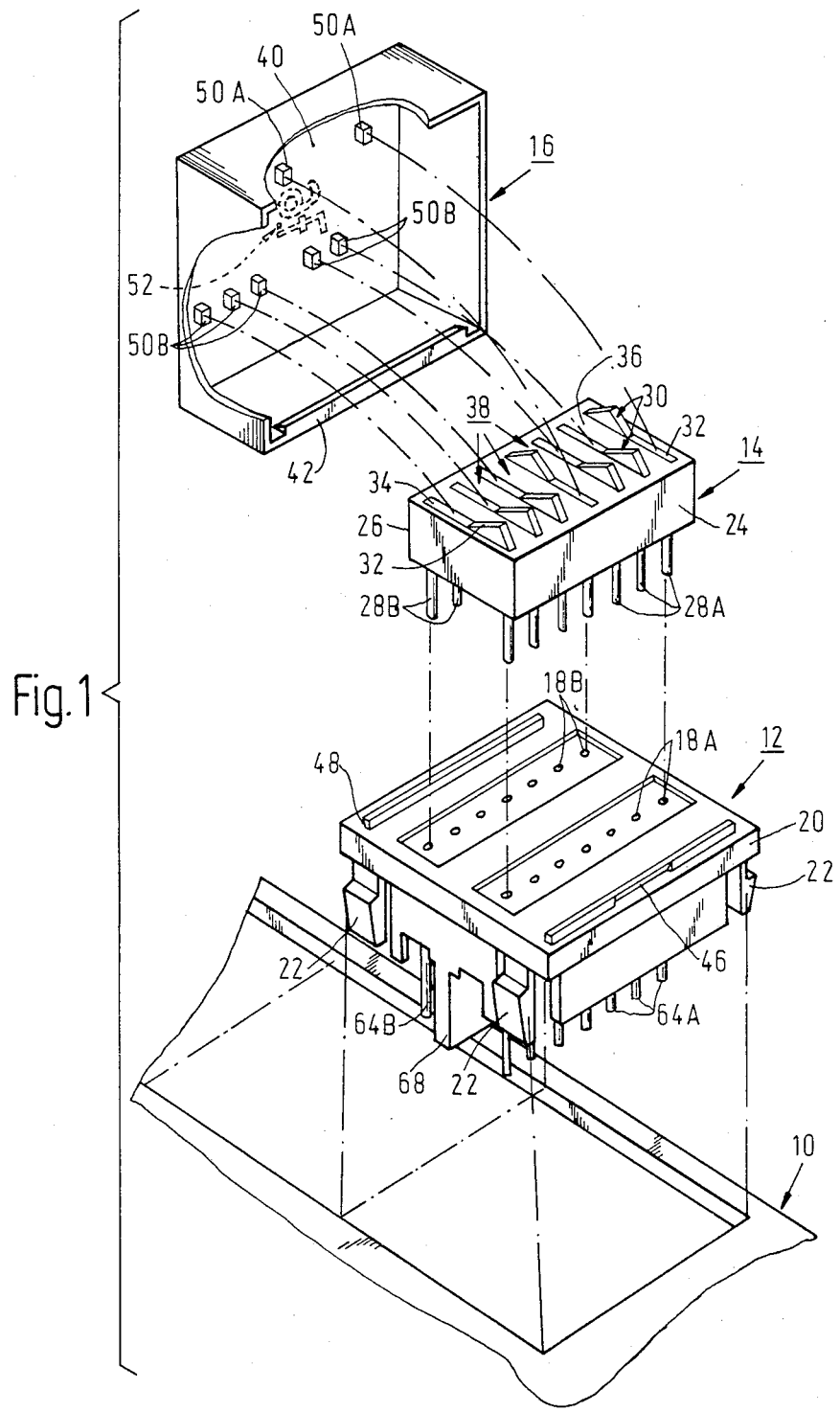
FIG. 1 is an exploded representation of a switch arrangement with a base.

The switch arrangement represented in FIG. 1 serves for setting the 7-place binary number corresponding to the decimal number 37 as the address of a data processing peripheral unit. The switch arrangement includes a frame 10 arranged on an opening of a housing, not represented, a base 12 fastened in the frame 10, a switch module 14 held plugged into the base 12 and a cover 16 which is releasably fastened onto the base 12 and covers the switch module 14.

The base 12, consisting of insulating plastic, is constructed substantially symmetrically with respect to a longitudinal center plane conceived of as running from the left front bottom up and toward the rear on the right in FIG. 1. It shows two parallel rows of 7 receptacles each 18A, 18B which are arranged symmetrically with respect to this longitudinal center plane, where the receptacles 18A, 18B are spaced apart in each row at regular equal intervals. The receptacles 18A, 18B extending parallel to the axis of the base 12 which is vertical in FIG. 1 are exposed with their receiving openings on the top side of the base 12. The receptacles 18A, 18B have a circular inner cross section. In the installed state the base 12 projects forward over the frame 10 by the height of an edge 20 running around it by which it rests on the front side of the frame 10, while two catches 22 in the form of a spring respectively on opposite sides of the base 12 penetrate the frame 10 and grasp its edge.

The switch module 14 is rectangular. Its longest length is somewhat smaller than the side length of the base 12. On its back side the switch module 14 shows two parallel rows of 7 connector pins 28A, 28B along two opposite lengthwise sides 24, 26. Their arrangement corresponds to that of the receptacles 18A, 18B, so that in the mounted state the switch module 14 is held through friction by its connector pins 28A, 28B in the receptacles 18A, 18B. Moreover, the switch module 14 contains 7 pairs of contacts, not represented, which are connected in it to two connector pins 28A, 28B situated opposite one another on the lengthwise sides 24, 26 and extend between these pins. On the front side of the switch module 14 are 7 switch rockers 30 exposed, which respectively lie in the plane of a pair of connector pins 28A, 28B situated opposite one another and which are each movable between two possible switching positions, movable around a lengthwise axis parallel to the lengthwise sides 24, 26. Their operating surfaces 32, 34 situated above enclose an obtuse angle between them which is about equal to the difference between 180 degrees and the pivoting angle around which the switch rockers 30 are movable. Thereby in a switch rocker situated in one of the possible switching positions, for example the one furthest to the right of FIG. 1, the operating surface 32 is aligned with the top side 36 of the body of the switch module 14, whereas in the other possible switching position, as is seen for example in the switch rocker 30 situated furthest left in FIG. 1, the other operating surface 34 is aligned with the top side 36. The switch rocker 30 protrudes out of the top side 36 by its nonaligned operating surface 34. Each switch rocker 30 has one of the above-mentioned pairs of contacts assigned to it and together with this forms a rocker switch 38.

The cover 16 has the shape of a box which is open below and square in cross section; its outer cross section dimensions are the same as the cross section of the base 12 in the region of the latter's edge 20. The cover 16 is freely accessible from the outside of the apparatus and protrudes by at least part of its height out of the housing, not represented, of the apparatus, in order to make it possible for it to be grasped and taken off if necessary. To achieve a low construction height of the switch arrangement, the height of the cover 16 is not substantially higher than the height of the switch module 14 and thus much smaller than the lateral length of the base 12. The end wall 40 of the cover 16 is provided with a readable symbol-with the decimal number 37 in the embodiment example, which designates the combination of the desired switch positions of the rocker switches 38 and thus the address to be set with the cover 16. On two opposite edges adjacent to the base 12 the cover 16 shows inward projecting catches 42, 44 (also compare FIG. 2) with which, yielding elastically, it grasps the catch surfaces 46, 48 formed on the base 12. By reason of this fastening, the cover 16 can be retained on the base 12 in only one possible fastening position with respect to the latter. On the inside of the end wall 40 of the cover 16 are formed operating lugs 50A, 50B, wherewith each rocker switch 38 has assigned to its either an operating lug 50A or an operating lug 50B. The operating lugs 50A have a position such that they act on and press down the corresponding switch rockers 30 on their operating surfaces 32, so that the corresponding rocker switches 38 assume the switching position of the rocker switch 38 located furthest to the right in FIG. 1 for example. The operating lugs 50B act in a corresponding manner on the operating surface 34, so that the other possible switching position is assumed. Thereby the cover 16 forces a combination of switching positions of the rocker switches 38 corresponding to a prescribed bit pattern or a prescribed binary number, where the said binary number corresponds to the symbol 52 represented on the end wall 40, namely the decimal number 37.

Figure 2:
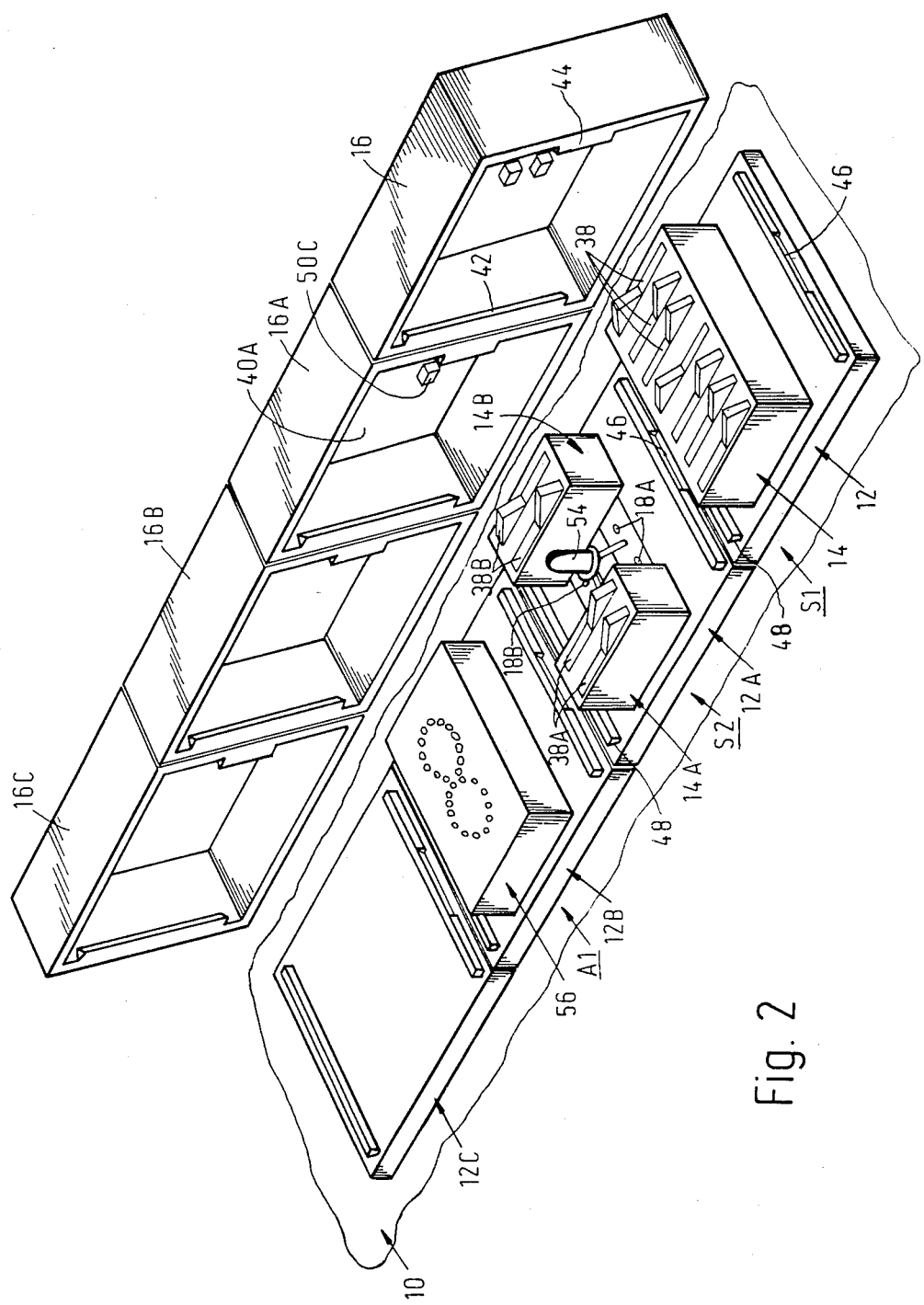
FIG. 2 in a partial perspective representation shows a switch arrangement in which additional indicator devices in addition to switch modules are provided on a number of bases.

The switch and indicator arrangement shown in FIG. 2 includes not only the switch arrangement S1 already described on the basis of FIG. 1 but also another switch arrangement S2, an indicator arrangement A1 and a base 12C which is not represented in detail as regards its further development, which are arranged in a row immediately adjacent to one another in the frame 10. Here the base 12A of the switch arrangement S2, the base 12B of the indicator arrangement A1 and the further base 12C are of exactly the same design as the base 12 of the switch arrangement S1, and the covers 16, 16A, 16B, 16C respectively assigned to them have the same outer dimensions as one another and consist of the same material, namely a transparent plastic.

In the switch arrangement S2 there are two switch modules 14A, 14B provided which each show only two rocker switches 38A, 38B, so that together they do not occupy all the receptacles 18A, 18B. Each rocker switch has assigned to it an operating lug 16A provided in the cover; in the drawing only one such lug 50C is to be seen. The switch modules 14A, 14B are arranged with a mutual spacing, and in the intermediate space between them is arranged an electrical light source in the form of a light-emitting diode 54, the two connecting wires of which are respectively plugged in a receptacle 18A and 18B. The light-emitting diode can serve to light up from the inside and make visible the symbol corresponding to the symbol 52 (FIG. 1) which is not visible and is provided on the end wall 40A of the cover 16A, and moreover the light-emitting diode 54 can serve as an operation indicator in that it is switched on only when the unit is in operation.

For the indicator device A1 an indicator module 56 is plugged into the base 12B, the dimensions of which module agree approximately with those of the switch module 14 and which in a corresponding manner is provided with connector pins, not represented, which are plugged into the receptacles of the base 12B. An alphanumeric character displayed by the indicator module 46 in its operation may for example serve to indicate to the user of the unit a certain operating state of the unit. This kind of indicator device can also serve to indicate the addresses set by switch arrangements of the type of the switch arrangement S1, where in this case the inner lighting of symbols of the type of the symbol 52 in FIG. 1 as explained on the basis of the switch arrangement S2 can be eliminated. The character represented is visible from the outside through the transparent cover 16B.

Figure 3:
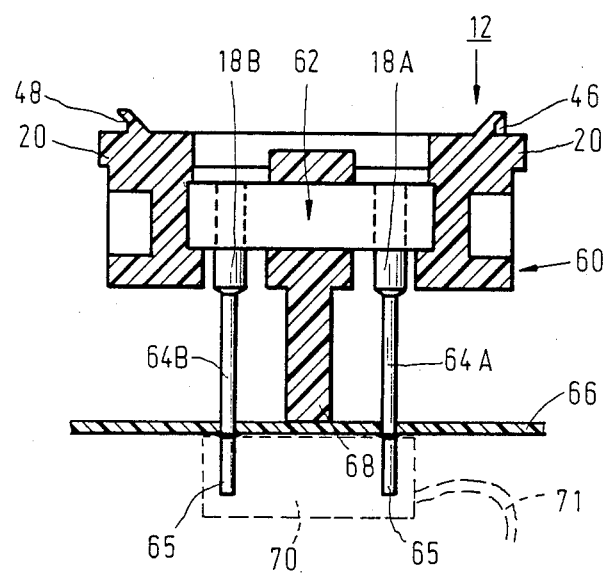
FIG. 3 shows a longitudinal section through a first possible embodiment of a base for use in a switch arrangement according to FIG. 1 or 2.
Figure 4:
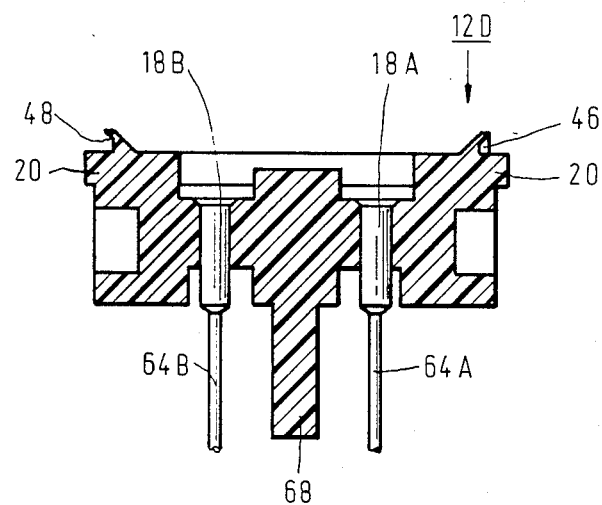
FIG. 4 shows a second possible embodiment of such a base.

As FIG. 3 shows, the base 12 (like the bases 12A to 12C in FIG. 2) consist of a frame 60 and a plate 62 held in this, through which the receptacles 18A, 18B pass. This makes its fabrication easier in that the receptacles 18A, 18B can be fastened in the plate 62 in a particularly simple manner. The plate 62 can then be cast integral with the frame 60. Another fabrication capability is shown in FIG. 4. Here the base 12D is formed from plastic in one piece, and the receptacles 18A, 18B are subsequently fastened in this. Moreover the base 12D is of the same design as the base 12.

As is further evident from FIG. 3, the receptacles 18A, 18B at their rear ends are respectively extended in an electrical terminal of the base 12 constructed as a pin 64A, 64B. These pins 64A, 64B may be soldered onto a circuit board 66 as in the embodiment example, where they are respectively connected with an electrical printed conductor, not represented. Insofar as a plurality of switch arrangements S1, S2 and/or indicator devices A1 are arranged next to one another as in the embodiment example of FIG. 2, the circuit boards 66 can be common to these, for which then it is further advantageous that these can be carried exclusively on the pins 64A, 64B of all the bases 12, 12A to 12C (FIG. 2), without other fastening means being required. In order to hold the circuit board 66 at a prescribed distance from the bases during its soldering onto the pins 64A, 64B and to increase the mechanical stability after soldering, the bases, as represented in the example of the base 12, may each show an extension 68 extending backward to the top side of the circuit board 66.

One or more of the switch arrangements described above, if necessary together with at least one indicator device as in FIG. 2, may be used not only in the application case described but also in many other application cases for electrical apparatus. The switch arrangement can be used to advantage anywhere where a certain combination of positions of a plurality of switches is to be maintained for a long period but it is necessary to be able to change this easily at any time.

I claim:

1. A modular switch unit which can be placed into an opening in a support frame (10) comprising:
   a generally rectangular molded plastic base (12) having a body portion (60) dimensioned to be inserted and received in close fitting relationship with at least a portion of said frame opening and a shoulder portion (20) which limits the extent of insertion;
   a plurality of pin-plug electrical receptacles (18) disposed in two parallel rows in said base (12) and having upwardly extending female ends and downwardly extending male ends, the male ends extending beyond said body portion and the female ends being substantially flush with an upper support surface of said base;
   at least one switch module having at least a pair of male contacts (28) extending from one surface thereof and a rocker (30) on an opposite surface thereof for opening and closing an electrical circuit between said contacts (28);
   said switch module being disposed on the base with said contacts (28) received in and frictionally held by the female ends of at least some of said receptacles (18);
   and a cover (16) removably disposed on said base in surrounding relationship to said module, said cover carrying on the interior surface thereof at least one switch rocker actuating element (50) in a predetermined position to actuate said rocker (30) to a predetermined condition.

2. A switch unit as defined in claim 1 wherein said switch module has a plurality of contact pairs and a corresponding plurality of rockers for actuating electrical circuit between said contact pairs, said cover having a plurality of rocker actuating elements (50) in a coded arrangement corresponding to a specific identification for said switch module.

3. Apparatus as defined in claim 2 further including indicia disposed on an exterior surface of said cover (16) for indicating said switch unit identification.

4. Apparatus as defined in claim 1 further including snap-lock catches (22) disposed on said base (12) for securing said base (12) to said frame (10) upon insertion thereof into said opening.

5. Apparatus as defined in claim 1 wherein said base (12) further includes an extension (68) extending parallel to said male ends of said receptacles (18), the dimension of said extension in the direction of said receptacles being less than said receptacles.

6. Apparatus as defined in claim 1 wherein said cover is made of a translucent material.

7. Apparatus as defined in claim 6 further including a light source disposed on said base and electrically connected between a pair of said receptacles.

8. Apparatus as defined in claim 1 further including a circuit board, the male ends of said base receptacles being soldered into said circuit board.

9. Apparatus as defined in claim 1 further including a support plate (62) integrally molded into said base (12) as an insert for supporting receptacles (18).

10. A modular switch unit comprising:
    a switch module having a plurality of pairs of male contacts extending from the bottom face thereof and a plurality of rockers on the top face thereof operative when rocked about an axis lying generally in the plane of said top face to open and close electrical circuits between respective contact pairs; and
    a cover located on said module in surrounding relation thereto and including a plurality of rocker actuating elements arranged in a coded arrangement on the interior of the top of said cover for respective coaction with said rockers.

11. A modular switch unit according to claim 10 wherein:
    said switch unit further includes a base having a plurality of female contact receptacles into which said male contacts on said switch module are plugged;
    said cover mounts to said base; and
    said cover and said base include coacting indexing means to ensure that said cover will be placed on said base in a predetermined singular position relative to said base and therefore relative to said rockers on said switch module.

* * * * *